US012780418B2

(12) United States Patent
Pozzi et al.

(10) Patent No.: US 12,780,418 B2
(45) Date of Patent: Nov. 3, 2026

(54) VEHICLE SEAT

(71) Applicant: Supernal, LLC, Washington, DC (US)

(72) Inventors: Alexander Pozzi, Carlsbad, CA (US); Christopher Ha, Irvine, CA (US)

(73) Assignee: Supernal, LLC, Irvine, CA (US)

(*) Notice: Subject to any disclaimer, the term of this patent is extended or adjusted under 35 U.S.C. 154(b) by 194 days.

(21) Appl. No.: 18/350,515

(22) Filed: Jul. 11, 2023

(65) Prior Publication Data

US 2024/0017833 A1 Jan. 18, 2024

Related U.S. Application Data

(60) Provisional application No. 63/368,331, filed on Jul. 13, 2022.

(51) Int. Cl.

*B64D 11/04* (2006.01)
*B60N 2/02* (2006.01)
*B60N 2/64* (2006.01)
*B60N 2/90* (2018.01)
*B64D 11/06* (2006.01)

(52) U.S. Cl.

CPC ............ *B64D 11/0606* (2014.12); *B60N 2/02* (2013.01); *B60N 2/64* (2013.01); *B60N 2/91* (2018.02); *B60N 2002/022* (2013.01); *B64D 11/0647* (2014.12)

(58) Field of Classification Search

CPC ....... B64D 11/0606; B60N 2/666; B60N 2/91
See application file for complete search history.

(56) References Cited

U.S. PATENT DOCUMENTS

| | | | | |
|---|---|---|---|---|
| 6,120,099 | A * | 9/2000 | Reikerås | B60N 2/868 297/391 |
| 9,033,420 | B2 * | 5/2015 | Lievestro | B64D 11/06 297/452.48 |
| 2015/0158593 | A1 * | 6/2015 | Quatmann | B60N 2/882 297/250.1 |
| 2019/0359106 | A1 * | 11/2019 | Suzuki | B60N 2/5628 |
| 2020/0238873 | A1 * | 7/2020 | Akaike | B60N 2/879 |
| 2022/0072982 | A1 * | 3/2022 | Shingne | B60N 2/80 |

FOREIGN PATENT DOCUMENTS

| | | | | |
|---|---|---|---|---|
| CN | 117246209 | A * | 12/2023 | |
| EP | 3950503 | A1 * | 2/2022 | B60N 2/242 |
| FR | 3115740 | A1 * | 5/2022 | B60N 2/6009 |
| FR | 3132474 | A1 * | 8/2023 | B60N 2/757 |
| WO | WO-2018169575 | A1 * | 9/2018 | B60N 2/22 |
| WO | WO-2022046095 | A1 * | 3/2022 | B64D 11/0606 |
| WO | WO-2022119562 | A1 * | 6/2022 | B64D 11/0606 |
| WO | WO-2023057776 | A1 * | 4/2023 | B60N 2/79 |

* cited by examiner

*Primary Examiner* — Timothy J Brindley
(74) *Attorney, Agent, or Firm* — Bookoff McAndrews, PLLC

(57) ABSTRACT

A seat comprising a seatback, a cushion, a screen, and a track system including a rail and an attachment mechanism, wherein the cushion is secured to the seatback via the track system and the cushion is configured to move along the seatback in a vertical direction.

19 Claims, 12 Drawing Sheets

VEHICLE SEAT

CROSS REFERENCE TO RELATED APPLICATIONS

This application claims priority to U.S. Provisional Application No. 63/368,331, filed on Jul. 13, 2022, which is incorporated by reference herein in its entirety.

TECHNICAL FIELD

Embodiments of this disclosure are directed to seats, specifically, a seat including privacy components.

BACKGROUND

Vehicles—including wagons, bicycles, motor vehicles (motorcycles, cars, trucks, and/or buses), railed vehicles (trains, trams), watercraft vehicles (ships, boats, and/or other underwater vehicles), amphibious vehicles (screw-propelled vehicles and/or hovercrafts), aircraft (airplanes, helicopters, aerostats, electric vertical takeoff and landing (eVTOL) vehicles), and/or spacecraft, among others—typically can accommodate multiple passengers with minimal to no privacy between each of the passengers. Currently, rudimentary privacy components may include dividers and/or shades between seats, such that the components are attached to a portion of the vehicle. Such privacy components are not integrated into the seats and are not easily adjustable. Current privacy components are also difficult for passengers to deploy and/or adjust, e.g., during motion of the vehicle. There is a desire to design vehicle seats including a physical and/or visual barrier between passengers to ensure functionality, provide comfort for the passengers, maintain privacy, minimize the spread of germs, and increase headrest and/or armrest cushion space.

SUMMARY OF THE DISCLOSURE

The present disclosure is directed to a seat comprising a seatback; a cushion; a screen; and a track system including a rail and attachment mechanism, wherein the cushion is secured to the seatback via the track system and the cushion is configured to move along the seatback in a vertical direction.

Various embodiments of the seat may include one or more of the following features. The cushion may be attached to a frontal surface of the seatback. The attachment mechanism may be a ball and pin arrangement, a screw, a fastener, a bolt, a clip, or combinations thereof. The track system may include a plurality of rails and a plurality of attachment mechanisms. The rail may be arranged along the seatback in a vertical direction. The seat may further comprise a release mechanism for moving the cushion via the track system. The seat may comprise at least two screens. In a first position, the screen may be stowed within the cushion, and in a second position, the screen may be deployed from the cushion.

The present disclosure also describes a seat comprising a seatback; a cushion; a plurality of screens, wherein in a first position, the plurality of screens is stowed within the cushion, and, in a second position, the plurality of screens is deployed from the cushion; a plurality of track systems, wherein at least one track system attaches the cushion to the seatback; and a release mechanism for moving the cushion along the seatback.

Various embodiments of the seat may include one or more of the following features. The first screen may deploy from the cushion in a first direction and a second screen may deploy from the cushion in a second direction. A first track system may secure the cushion to the seatback, a second track system may attach the first screen to the cushion, and a third track system may attach the second screen to the first screen. In the second position, the plurality of screens may be adjustable to various positions relative to the cushion. The release mechanism may be a button or an actuator. Each of the track systems may include a rail and a ball and pin arrangement, wherein the ball and pin arrangement may couple the cushion to the rail. Upon actuation of the release mechanism, the ball and pin arrangement may retract from the cushion and the cushion may move along the rail in a vertical direction.

The present disclosure also describes a seatback; a cushion; a first screen and a second screen, wherein the first screen and the second screen are located at a posterior surface of the cushion; a track system attaching the cushion to the seatback, wherein the track system includes a plurality of rails and a plurality of ball and pin arrangements; and a release mechanism located on the seatback.

Various embodiments of the seat may include one or more of the following features. A cushion track system for attaching the first screen to the cushion. A screen track system for attaching the second screen to the first screen. In a first position, the first screen and the second screen may be stowed and in a second position, the first screen and the second screen may be deployed outwards from the cushion. The first screen may include a first plurality of screens and the second screen may include a second plurality of screens.

BRIEF DESCRIPTION OF THE FIGURES

The accompanying drawings, which are incorporated in and constitute a part of this specification, illustrate various examples and, together with the description, serve to explain the principles of the disclosed examples and embodiments.

Aspects of the disclosure may be implemented in connection with embodiments illustrated in the attached drawings. These drawings show different aspects of the present disclosure and, where appropriate, reference numerals illustrating like structures, components, materials, and/or elements in different figures are labeled similarly. It is understood that various combinations of the structures, components, and/or elements, other than those specifically shown, are contemplated and are within the scope of the present disclosure.

Moreover, there are many embodiments described and illustrated herein. The present disclosure is neither limited to any single aspect or embodiment thereof, nor is it limited to any combinations and/or permutations of such aspects and/or embodiments. Moreover, each of the aspects of the present disclosure, and/or embodiments thereof, may be employed alone or in combination with one or more of the other aspects of the present disclosure and/or embodiments thereof. For the sake of brevity, certain permutations and combinations are not discussed and/or illustrated separately herein. Notably, an embodiment or implementation described herein as "exemplary" is not to be construed as preferred or advantageous, for example, over other embodiments or implementations; rather, it is intended to reflect or indicate the embodiment(s) is/are "example" embodiment (s).

Figure 1:
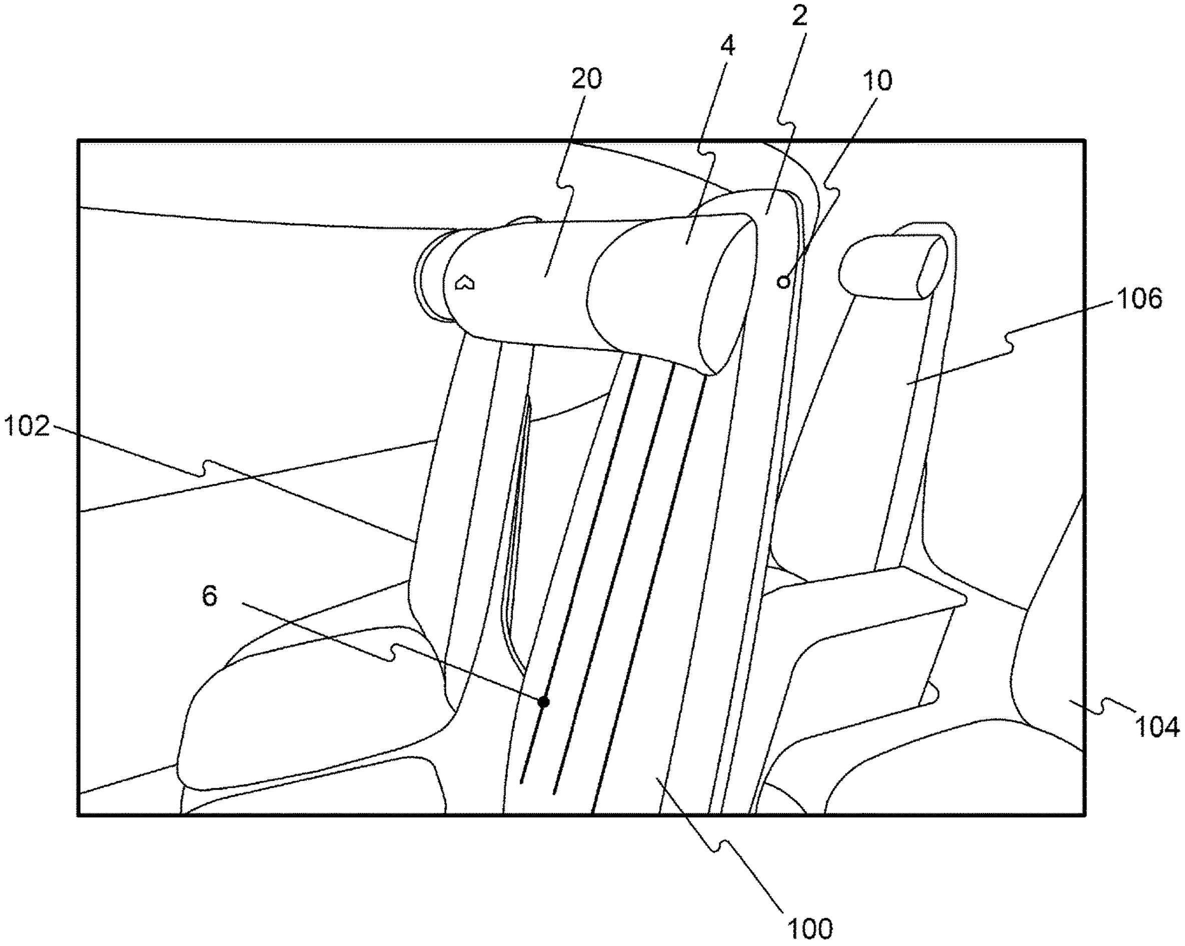

FIG. 1 is a perspective front view of a seat, according to embodiments of the present disclosure.

Figure 2A:
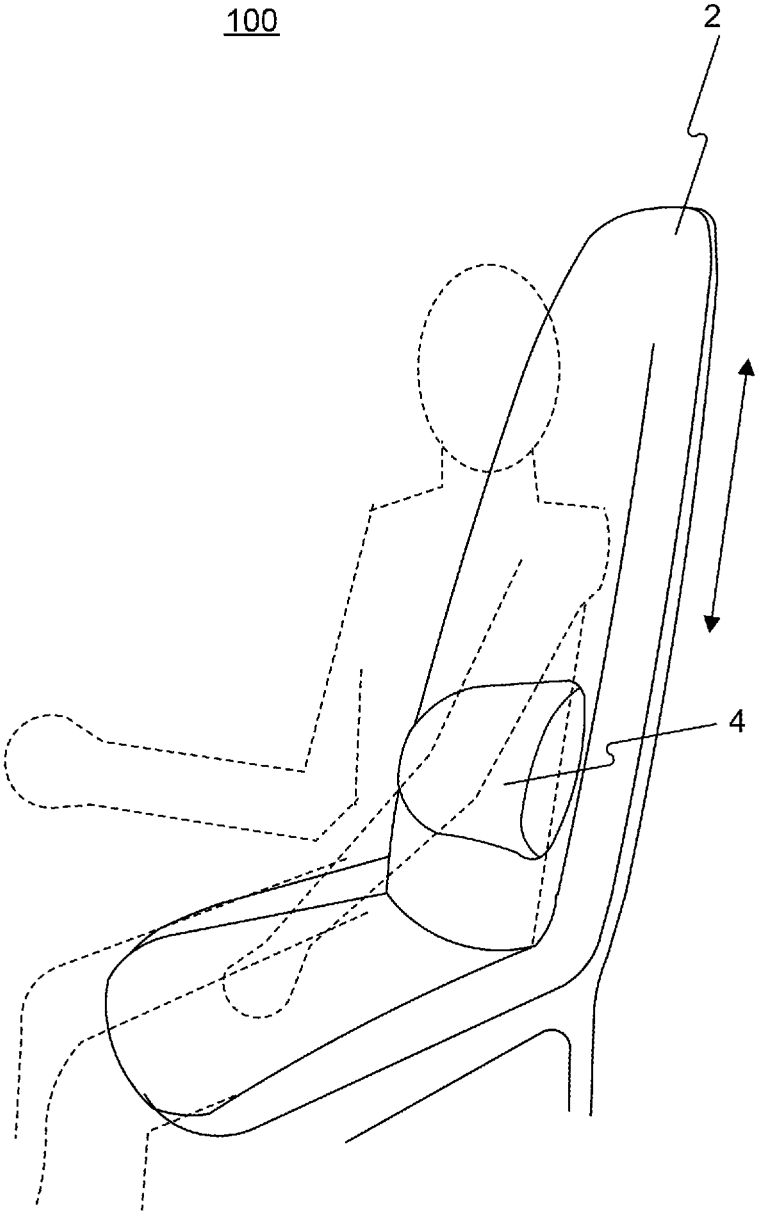
Figure 2B:
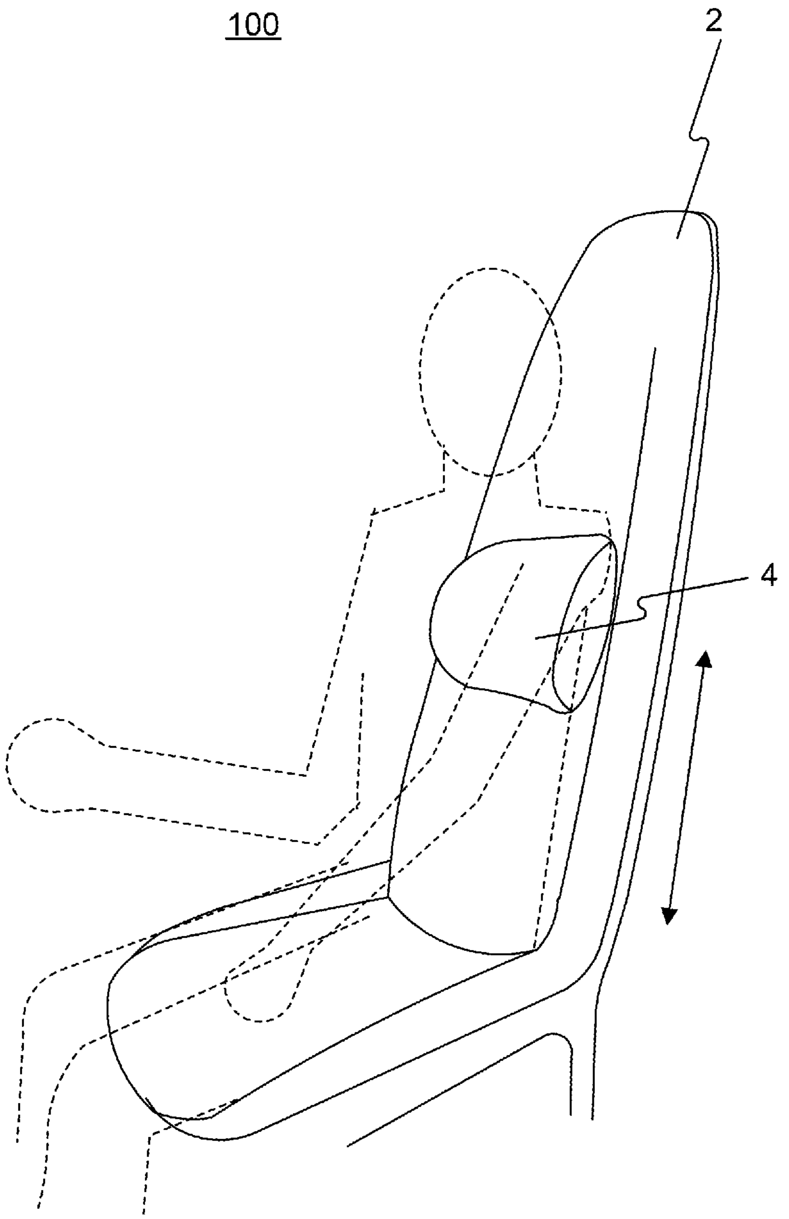

FIGS. 2A and 2B are perspective front views of a seat, according to embodiments of the present disclosure.

Figure 3A:
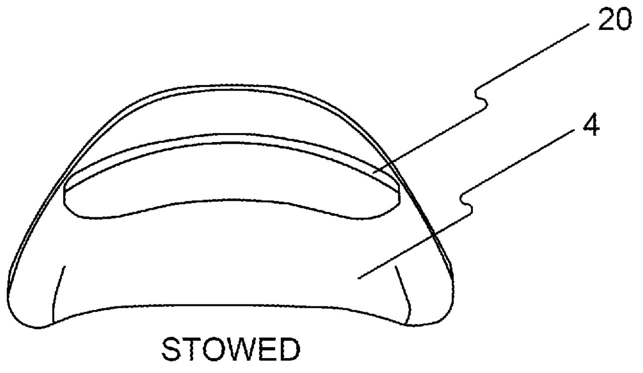
Figure 3B:
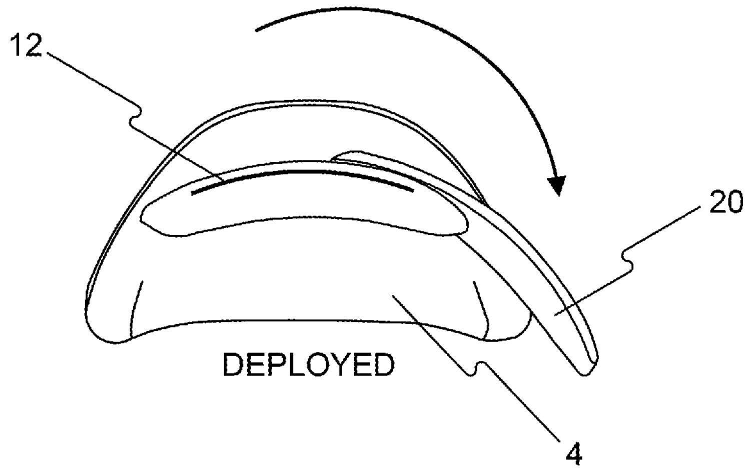

FIGS. 3A and 3B are top views of a cushion, according to embodiments of the present disclosure.

Figure 4:
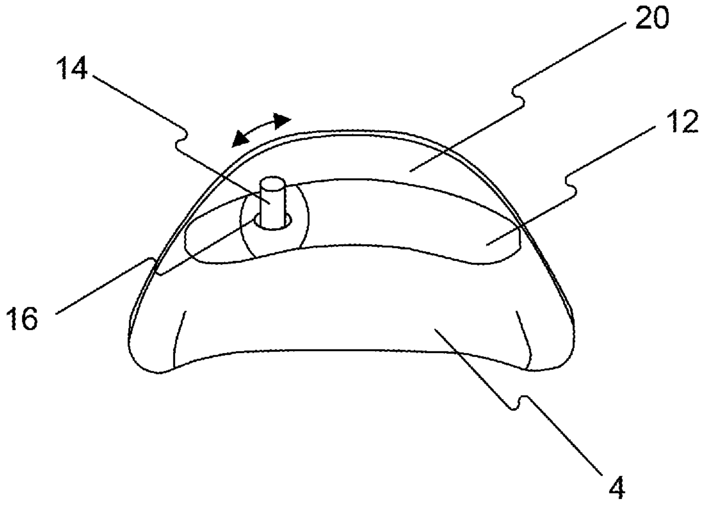

FIG. 4 is a top view of a cushion, according to embodiments of the present disclosure.

Figure 5:
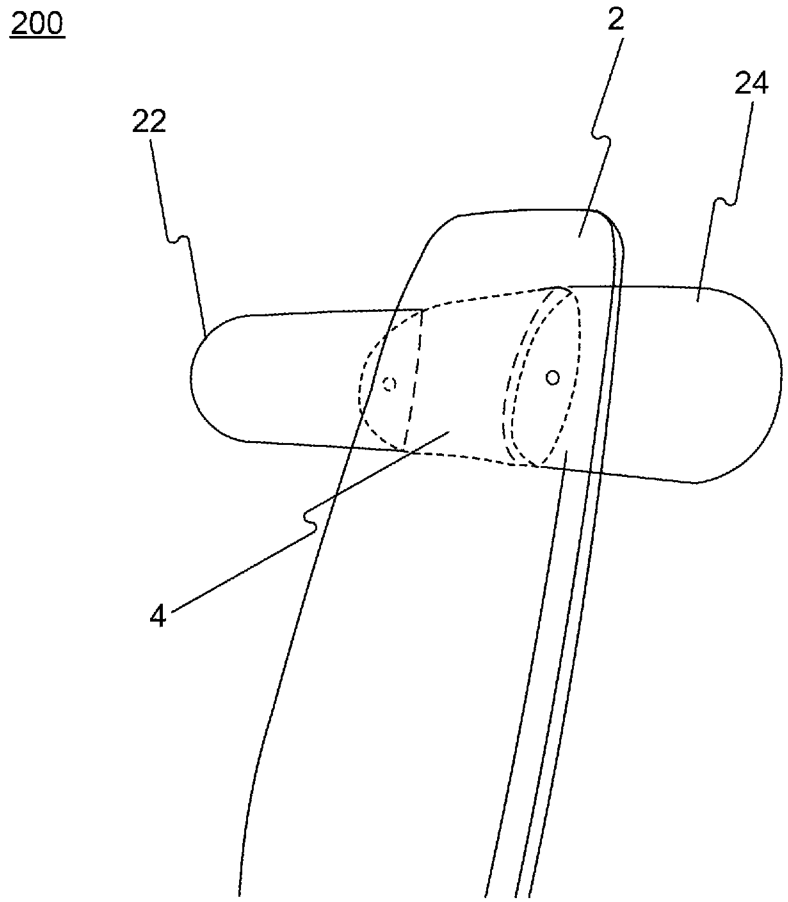

FIG. 5 is a perspective front view of a seat, according to embodiments of the present disclosure.

Figure 6A:
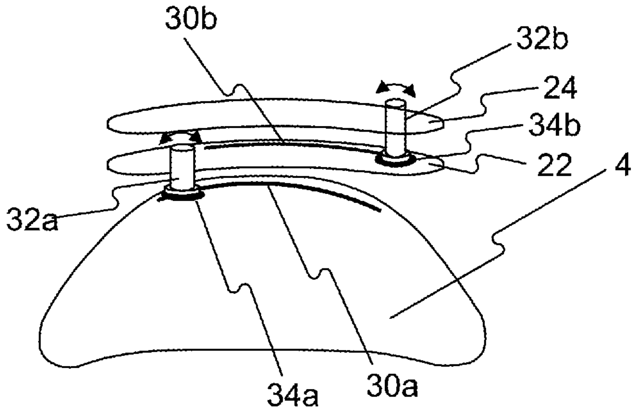
Figure 6B:
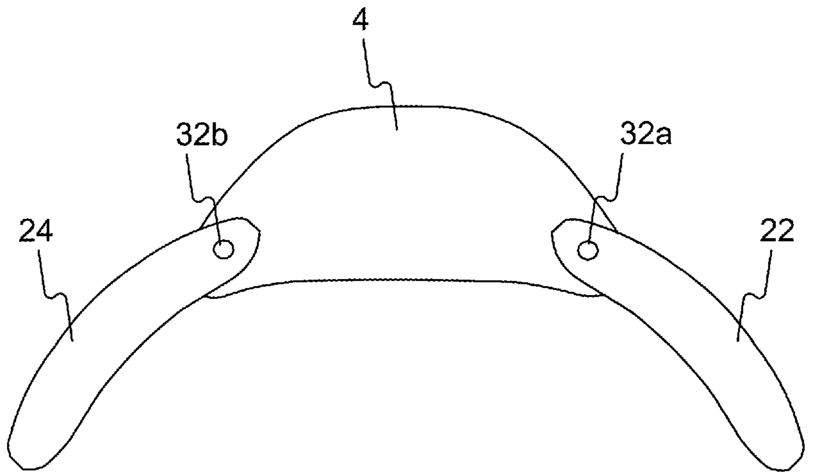

FIG. 6A is a bottom view of a cushion and screens according to embodiments of the present disclosure and FIG. 6B is a top view of a cushion and screens according to embodiments of the present disclosure.

Figure 7:
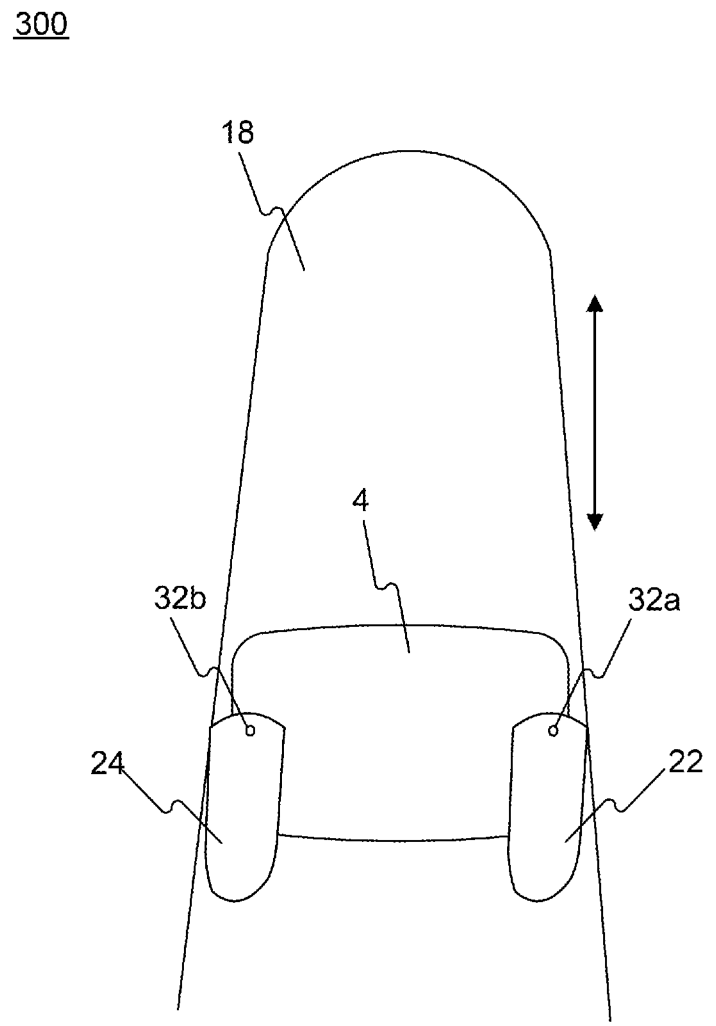

FIG. 7 is a rear view of a seat, including screens, according to embodiments of the present disclosure.

Figure 8:
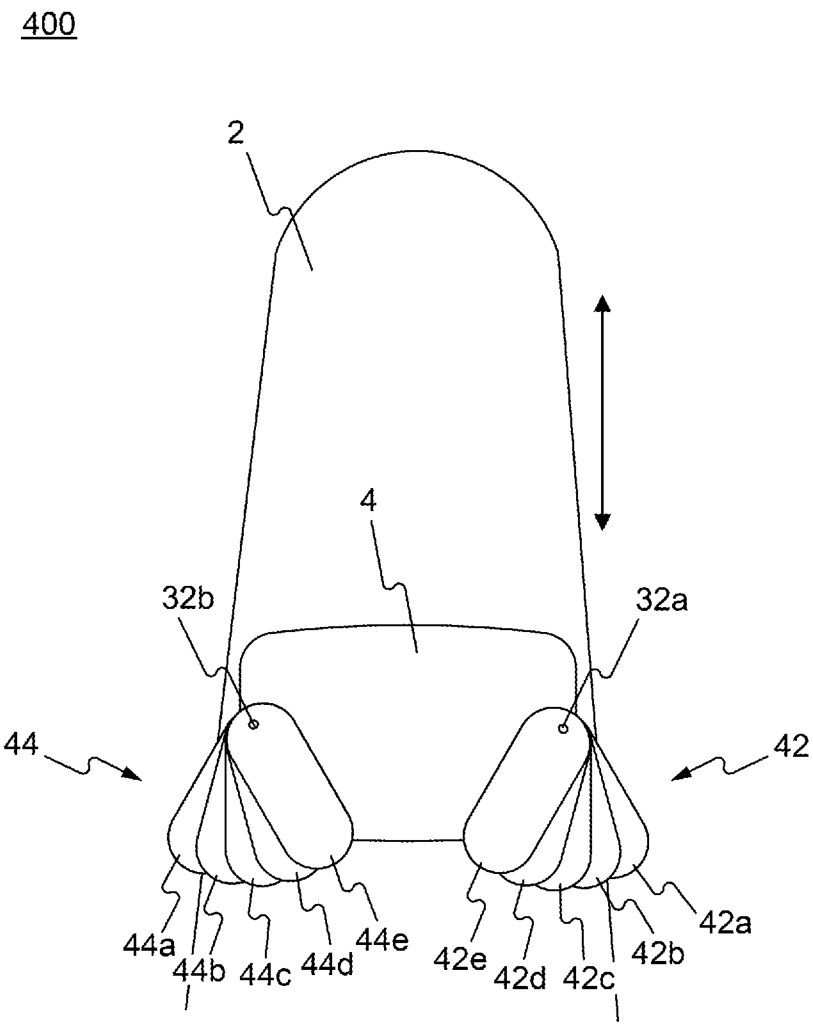

FIG. 8 is a rear view of a seat, including screens, according to embodiments of the present disclosure.

Figure 9A:
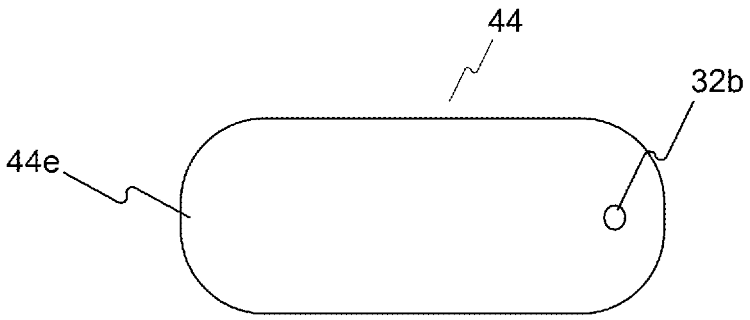
Figure 9B:
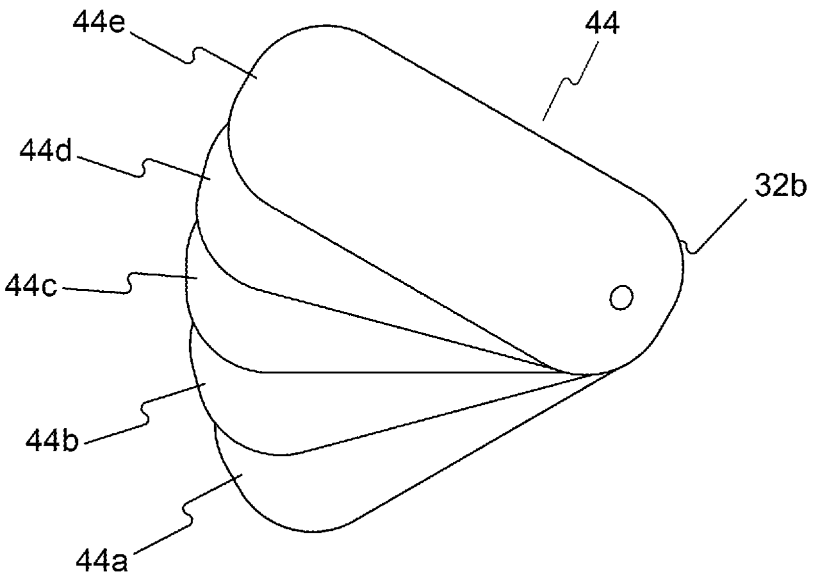

FIGS. 9A and 9B are detailed views of screens, according to embodiments of the present disclosure.

Figure 10:
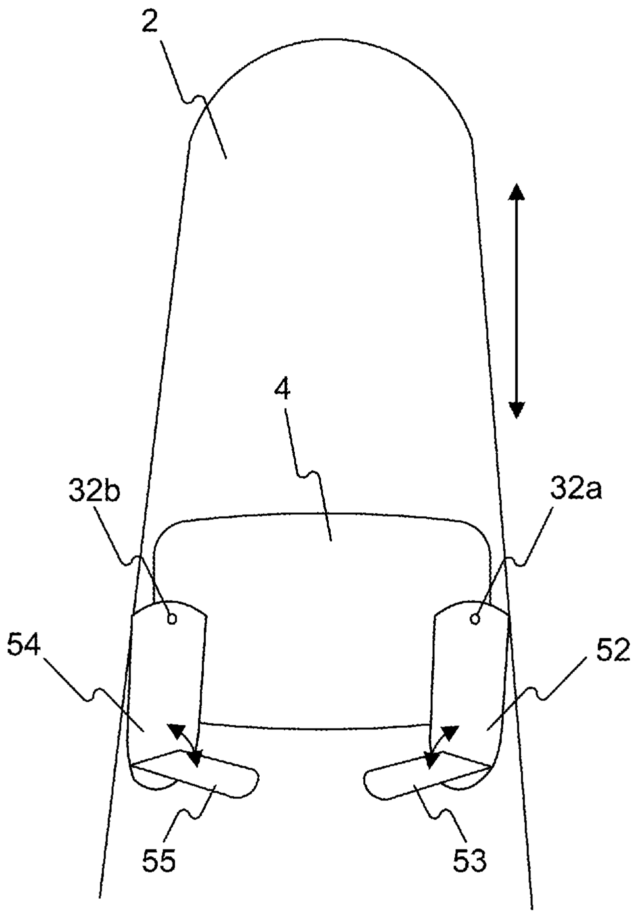

FIG. 10 is a rear view of a seat, including screens, according to embodiments of the present disclosure.

Figure 11:
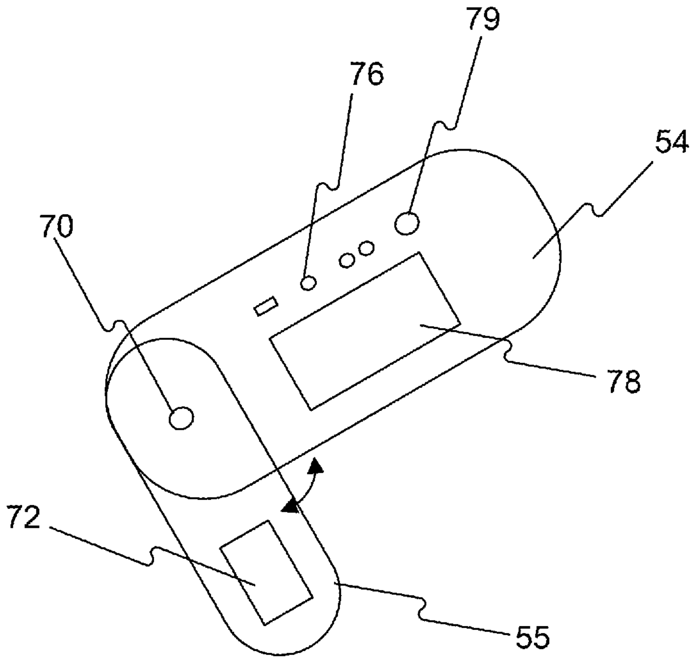

FIG. 11 is a detailed view of a screen, according to embodiments of the present disclosure.

As used herein, the terms "comprises," "comprising," "includes," "including," or any other variation thereof, are intended to cover a non-exclusive inclusion, such that a process, method, article, or apparatus that comprises a list of elements does not include only those elements, but may include other elements not expressly listed or inherent to such process, method, article, or apparatus. In addition, the terms "first," "second," and the like, herein do not denote any order, quantity, or importance, but rather are used to distinguish an element or a structure from another. Moreover, the terms "a" and "an" herein do not denote a limitation of quantity, but rather denote the presence of one or more of the referenced items.

Notably, for simplicity and clarity of illustration, certain aspects of the figures depict the general structure and/or manner of construction of the various embodiments. Descriptions and details of well-known features and techniques may be omitted to avoid unnecessarily obscuring other features. Elements in the figures are not necessarily drawn to scale; the dimensions of some features may be exaggerated relative to other elements to improve understanding of the example embodiments. For example, one of ordinary skill in the art appreciates that the side views are not drawn to scale and should not be viewed as representing proportional relationships between different components. The side views are provided to help illustrate the various components of the depicted assembly, and to show their relative positioning to one another.

DETAILED DESCRIPTION

Reference will now be made in detail to examples of the present disclosure, which are illustrated in the accompanying drawings. Wherever possible, the same reference numbers will be used throughout the drawings to refer to the same or like parts. In the discussion that follows, relative terms such as "about," "substantially," "approximately," etc. are used to indicate a possible variation of ±10% in the stated value. In this disclosure, unless stated otherwise, any numeric value may include a possible variation of ±10% in the stated value.

As discussed above, rudimentary privacy components may include dividers and/or shades between seats, such that the components are attached to a portion of the vehicle. Such privacy components are not integrated into the seats and are not easily adjustable. Current privacy components are also difficult for passengers to deploy and/or adjust, e.g., during motion of the vehicle. Passengers may experience discomfort, e.g., from altering their posture, crouching, and/or bending over, to deploy and/or adjust privacy components. Further, such privacy components may take up space within the seat and/or around the passenger(s) and/or add unnecessary weight to the vehicles.

The present disclosure references a seat for a vehicle. Those of ordinary skill in the art will readily recognize that the concepts of the present disclosure may be utilized in configuration and designs where a seat with privacy components is needed. The present disclosure makes reference to a vehicle, which includes wagons, bicycles, motor vehicles (motorcycles, cars, trucks, and/or buses), railed vehicles (trains, trams), watercraft vehicles (ships, boats, and/or other underwater vehicles), amphibious vehicles (screw-propelled vehicles and/or hovercrafts), aircraft (airplanes, helicopters, aerostats, eVTOLs), and/or spacecraft. Those of ordinary skill in the art will readily recognize that the listing of vehicles above is exemplary and that the concepts of the present disclosure may be used in conjunction with any suitable or comparable vehicle.

Embodiments of the present disclosure relate to a seat, and, in particular, a seat for a vehicle. FIG. 1 depicts a plurality of seats 100, 102, 104, and 106, which may be configured in a vehicle. Seat 100 is an exemplary seat according to the present disclosure. Seat 100 may include a seatback 2 and cushion 4. Cushion 4 may be attached to a portion of seatback 2. Seatback 2 may include a frontal surface and a posterior surface. As shown in FIG. 1, cushion 4 may be attached to a frontal surface of seatback 2. Referring to seat 100, seatback 2 may include a track system allowing for movement of cushion 4 on seatback 2.

The track system may be any appropriate means for allowing cushion 4 to move along seatback 2. As shown in FIG. 1, cushion 4 may move along seatback 2 in a vertical direction. In other examples, cushion 4 may along seatback 2 in a longitudinal direction. For example, the track system may include a rail 6 and an attachment mechanism (not shown). The attachment mechanism may be any mechanism configured to attach cushion 4 to seatback 2. For example, the attachment mechanism may be ball and pin arrangements, screws, fasteners, bolts, clips, a t-shaped head, or a mushroom shaped head (e.g., a disk or a plurality of disks that may slide into and attach to a portion of rail 6), or any appropriate attachment mechanism. In other embodiments, the track system may be a system of tubes, tails, slides, and/or channels, e.g., an Igus® slide. In some embodiments, the track system may include a rail 6 and an attachment mechanism, where rail 6 may include a slot or a plurality of slots configured to receive the attachment mechanism. For example, rail 6 may include at least one slot configured to receive at least one attachment mechanism.

Seatback 2 may include a plurality of rails 6 and a plurality of attachment mechanisms. The number of rails 6 and attachment mechanisms may be selected based on the size of the seat and/or the size of cushion 4. In some examples, seatback 2 may include at least one rail, at least two rails, or at least three rails. Seatback 2 may include at least one attachment mechanism, at least two attachment mechanisms, or at least three attachment mechanisms. The number of rails 6 may correspond to the number of attachment mechanisms. For example, seat 100 may include one rail and one attachment mechanism, seat 100 may include two rails and two attachment mechanisms, or seat 100 may include three rails and three attachment mechanisms. In other examples, the number of rails 6 may not correspond to the number of attachment mechanisms. FIG. 1 depicts rails 6 arranged vertically along seatback 2. In other embodiments, rails 6 may be arranged longitudinally along seatback 2. In some embodiments, seatback 2 may include rails 6 arranged in both a vertical direction and a longitudinal direction along seatback 2.

Cushion 4 may include a frontal surface and a posterior surface. As shown in FIG. 1, the posterior surface of cushion 4 may be attached to the frontal surface of seatback 2. Cushion 4 may be attached to the attachment mechanism. For example, the posterior surface of cushion 4 may be attached to the attachment mechanism. The posterior surface of cushion 4 may include a plurality of holes (not shown) for securing cushion 4 to seatback 2. For example, the attachment mechanism may be secured into a corresponding hole of cushion 4. If cushion 4 includes a plurality of attachment mechanisms, cushion 4 may include a plurality of holes for securing such attachment mechanism. Referring to FIG. 1, cushion 4 may include at least hole for securing at least one attachment mechanism, wherein the attachment mechanism may be received in at least one rail 6.

Seat 2 may include a release mechanism 10. Release mechanism 10 may allow for movement of cushion 4 along seatback 2, e.g., along a portion of the track system. During use, the passenger may depress or actuate release mechanism 10 to move cushion 4 along a vertical and/or longitudinal direction of seatback 2. Release mechanism 10 may be a button, a lever, an actuator, or any other appropriate means for allowing cushion 4 to move along a portion seatback 2. Release mechanism 10 may be located on any appropriate portion of seat 100. As shown in FIG. 1, release mechanism 10 may be located on a portion of seatback 2. For example, release mechanism 10 may be located on a portion of seatback 2 proximate to cushion 4. In other embodiments, release mechanism 10 may be located on a portion of cushion 4. Seat 100 may include a plurality of release mechanisms 10. For example, a first release mechanism 10 may be located on a portion of seatback 2 and a second release mechanism 10 may be located on a portion of cushion 4. The use of multiple release mechanisms 10 may allow for a malfunction backstop or redundancy. In other words, if a first release mechanism malfunctions, the second release mechanism may be utilized. In other embodiments, cushion 4 may be configured such that it is movable and/or adjustable without a release mechanism. For example, cushion 4 may be attached to a portion of seat 100, e.g., the track system, using a press-fit or friction-based attachment.

Some embodiments of the present disclosure may include a track system including rail 6 and an attachment mechanism, e.g., a ball and pin arrangement, and release mechanism 10. In such configurations, cushion 4 may be secured to seatback 2 via the ball and pin arrangement, as described above. To move and/or adjust cushion 4, the passenger may actuate, e.g., depress, release mechanism 10, allowing the ball and pin arrangement to retract from the corresponding hole in cushion 4. This release may then allow cushion 4 to move along rail 6 in a vertical direction (see FIGS. 2A-2B).

As mentioned above, cushion 4 may be attached to a portion of seat 100, e.g., seatback 2, by any appropriate attachment mechanism, e.g., pins, clamps, screws, notches, rails, channels, slides, tubes, or combinations thereof. The attachment mechanism may be configured such that cushion 4 may be moved to a number of desired portions. For example, in embodiments where cushion 4 may be attached to seatback 2 via pins and/or clamps, seat 100 may include a pin system and/or a clamp system, wherein a first portion of the pin/clamp system may be attached to cushion 4 and a second portion of the pin/clamp system may be attached to a portion of seatback 2, such that the first portion may be received in the second portion. The locations of the second portion, i.e., receiving portion, of the pin/clamp system may designate the various locations that cushion 4 may be positioned. For example, the passenger may detach cushion 4 from seatback 2 by unclipping and/or or unclamping cushion 4 from a first receiving portion and then reattaching cushion 4 to a second receiving portion located at a different position on seatback 2.

As shown in FIG. 1, cushion 4 may include a screen 20. Screen 20 may be referred to herein as a wing, barrier, privacy wing, and/or privacy screen. Screen 20 may be designed and/or configured to act as a visual barrier between passengers. Screen 20 may also be designed and/or configured to act as a hygiene screen/sneeze guard to limit transmission of germs between passengers. In some examples, screen 20 may be designed and/or configured to provide additional surface area for the passenger to rest portions of their body against, e.g., their head, arm, and/or forearm. For example, screen 20 may serve as an extension of cushion 4. As shown in FIGS. 3A-3B, screen 20 may have a generally planar surface. In some examples, screen 20 may have a slightly curved shaped. Screen 20 may have any appropriate shape and/or configuration such that screen 20 may be attached within or to portions of seat 100, and such that screen 20 may provide a proper barrier and/or surface for the passenger.

Components of the seats described in this disclosure may be formed of any suitable material with sufficient weight and components to withstand energy and impact from the vehicle and/or with any characteristics suitable for use in a vehicle. The seats and any of its components, e.g., cushion 4, screen 20, track systems, etc., may include plastic materials, metals, metallic materials, polymers, composite materials, or combinations thereof. For example, cushion 4 and/or screen 20 may include a foam material, e.g., a memory foam, for added comfort to the passenger. In some embodiments, components of the seat may be made of metal machined to a desired configuration.

FIGS. 3A and 3B depict how screen 20 may be configured within cushion 4. For example, screen 20 may be located within cushion 4, such that screen 20 may be deployed from cushion 4 by the passenger at the desired time. Once the passenger deploys screen 20, screen 20 may extend from a portion of cushion 4. For example, as shown in FIG. 3B, screen 20 may extend in a right direction from cushion 4. In other examples, screen 20 may extend in a left direction from cushion 4. Some embodiments may be designed such that screen 20 may extend upwards from cushion 4 and/or downwards from cushion 4. In some embodiments, cushion 4 and screen 20 may be configured such that screen 20 may extend in either a left direction from cushion 4 or a right direction from cushion 4. For example, the passenger may deploy screen 20 in a right direction and then switch it to deploy screen 20 in a left direction, or vice versa, the passenger may deploy screen 20 in a left direction and then switch it to deploy screen 20 in a right direction. In other embodiments, screen 20 may be attached to a part of seat 100. For example, screen 20 may be attached to a portion of seatback 2 behind cushion 4.

Seats 100 according to the present disclosure may be of any appropriate size such that the seat may properly fit in a desired vehicle. Seats 100 may have any appropriate size conforming to vehicle standards and/or safety standards. For example, seats 100 and/or seatback 2 may have a width ranging from about 14 inches to about 20 inches. For example, a width of seat 100 may range from about 14 inches to about 18 inches, about 14 inches to about 16 inches, about 16 inches to about 20 inches, or about 16 inches to about 18 inches. In some examples, a width of the seat may be about 14 inches, about 15 inches, about 16 inches, about 17 inches, about 18 inches, about 19 inches, or about 20 inches. Seats 100 and/or seatback 2 may have a height ranging from about 20 inches to about 40 inches. For example, a height of seatback 2 may range from about 25 inches to about 40 inches, about 25 inches to about 35 inches, about 25 inches to about 30 inches, about 20 inches to about 35 inches, about 20 inches to about 30 inches, about 20 inches to about 25 inches, about 30 inches to about 40 inches, or about 35 inches to about 40. In some examples, a height of seatback 2 may be about 20 inches, about 22 inches, about 24 inches, about 26 inches, about 28 inches, about 30 inches, about 32 inches, about 34 inches, about 36 inches, about 38 inches, or about 40 inches.

Cushions 4 according to the present disclosure may be of any size such that cushion 4 may be configured and/or attached to a portion of seat 100. For example, cushion 4 may have a width ranging from about 4 inches to about 20 inches. For example, a width of cushion 4 may range from about 4 inches to about 18 inches, about 4 inches to about 16 inches, about 4 inches to about 14 inches, about 4 inches to about 12 inches, about 4 inches to about 10 inches, about 4 inches to about 8 inches, about 6 inches to about 20 inches, about 6 inches to about 18 inches, about 6 inches to about 16 inches, about 6 inches to about 14 inches, about 6 inches to about 12 inches, about 6 inches to about 10 inches, about 8 inches to about 20 inches, about 8 inches to about 18 inches, about 8 inches to about 16 inches, about 8 inches to about 14 inches, about 8 inches to about 12 inches, about 10 inches to about 20 inches, about 10 inches to about 18 inches, about 10 inches to about 16 inches, about 10 inches to about 14 inches, about 12 inches to about 20 inches, about 12 inches to about 18 inches, about 12 inches to about 16 inches, about 14 inches to about 20 inches, about 14 inches to about 18 inches, or about 16 inches to about 20 inches.

Cushion 4 may have a height ranging from about 4 inches to about 20 inches. For example, a height of cushion 4 may range from about 4 inches to about 18 inches, about 4 inches to about 16 inches, about 4 inches to about 14 inches, about 4 inches to about 12 inches, about 4 inches to about 10 inches, about 4 inches to about 8 inches, about 6 inches to about 20 inches, about 6 inches to about 18 inches, about 6 inches to about 16 inches, about 6 inches to about 14 inches, about 6 inches to about 12 inches, about 6 inches to about 10 inches, about 8 inches to about 20 inches, about 8 inches to about 18 inches, about 8 inches to about 16 inches, about 8 inches to about 14 inches, about 8 inches to about 12 inches, about 10 inches to about 20 inches, about 10 inches to about 18 inches, about 10 inches to about 16 inches, about 10 inches to about 14 inches, about 12 inches to about 20 inches, about 12 inches to about 18 inches, about 12 inches to about 16 inches, about 14 inches to about 20 inches, about 14 inches to about 18 inches, or about 16 inches to about 20 inches.

Screens 20 according to the present disclosure may be of any size such that screen 20 may be configured to and/or attached to a portion of cushion 4 and/or seat 100. For example, screen 20 may have a width ranging from about 4 inches to about 20 inches. For example, a width of screen 20 may range from about 4 inches to about 18 inches, about 4 inches to about 16 inches, about 4 inches to about 14 inches, about 4 inches to about 12 inches, about 4 inches to about 10 inches, about 4 inches to about 8 inches, about 6 inches to about 20 inches, about 6 inches to about 18 inches, about 6 inches to about 16 inches, about 6 inches to about 14 inches, about 6 inches to about 12 inches, about 6 inches to about 10 inches, about 8 inches to about 20 inches, about 8 inches to about 18 inches, about 8 inches to about 16 inches, about 8 inches to about 14 inches, about 8 inches to about 12 inches, about 10 inches to about 20 inches, about 10 inches to about 18 inches, about 10 inches to about 16 inches, about 10 inches to about 14 inches, about 12 inches to about 20 inches, about 12 inches to about 18 inches, about 12 inches to about 16 inches, about 14 inches to about 20 inches, about 14 inches to about 18 inches, or about 16 inches to about 20 inches.

Screen 20 may have a height ranging from about 4 inches to about 20 inches. For example, a width of screen 20 may range from about 4 inches to about 18 inches, about 4 inches to about 16 inches, about 4 inches to about 14 inches, about 4 inches to about 12 inches, about 4 inches to about 10 inches, about 4 inches to about 8 inches, about 6 inches to about 20 inches, about 6 inches to about 18 inches, about 6 inches to about 16 inches, about 6 inches to about 14 inches, about 6 inches to about 12 inches, about 6 inches to about 10 inches, about 8 inches to about 20 inches, about 8 inches to about 18 inches, about 8 inches to about 16 inches, about 8 inches to about 14 inches, about 8 inches to about 12 inches, about 10 inches to about 20 inches, about 10 inches to about 18 inches, about 10 inches to about 16 inches, about 10 inches to about 14 inches, about 12 inches to about 20 inches, about 12 inches to about 18 inches, about 12 inches to about 16 inches, about 14 inches to about 20 inches, about 14 inches to about 18 inches, or about 16 inches to about 20 inches.

In some embodiments, screen 20 may have a height and/or width equivalent to a height and/or width of cushion 4. The various dimensions of cushion 4 and/or screen 20 may be designed to ensure various levels of privacy, to provide various sized barriers, and/or to provide additional surface area for the passenger, e.g., additional surface area for resting/cushion.

The various track systems, attachment mechanisms, and/or release mechanisms, as described above, may be designed and/or configured to easily move and/or adjust cushion 4 to different positions of seat 100. The various positions of cushion 4 may provide comfort to the passenger, e.g., as a headrest (FIG. 1), as a lumbar support, i.e., lower back support (FIG. 2A) or as a thoracic spine support, e.g., upper and middle back support (FIG. 2B). The various track systems, attachment mechanisms, and/or release mechanisms of the present disclosure may allow for movement of cushion 4 in numerous directions, including vertically and longitudinally on seatback 2. This may provide for support to a multitude of positions on the passenger, e.g., head, upper back, middle back, and/or lower back. In embodiments where seatback 2 may include at least one rail 6 in a longitudinal position, cushion 4 may move in a side-to-side, i.e., left to right, direction.

Referring to FIG. 4, cushion 4 may include a cushion track system. The cushion track system may correspond to and/or include similar components to the track system of seat 100 as described above. As shown in FIG. 4, the cushion track system may include a track 12 and an attachment mechanism 14. Attachment mechanism 14 may be ball and pin arrangements, screws, fasteners, bolts, clips, straps, or any appropriate attachment mechanism. Track 12 may be located at any appropriate portion of cushion 4. For example, track 12 may be located longitudinally to cushion 4. As shown in FIG. 4, track 12 may include a hole 16. Attachment mechanism 14 may be attached to a portion of screen 20. In embodiments where attachment means 20 is a ball and pin arrangement, attachment mechanism 14 may interact with hole 16 of track 12 to secure screen 20 onto cushion 4. For example, attachment mechanism 14 may be received within hole 16 of track 12. If the passenger wants to deploy screen 20 in the right direction, the passenger may manually move screen 20 in the opposite intended direction of deployment, i.e., in the left direction, to remove and/or retract attachment mechanism 14 from hole 16. The passenger may only have to minimally or slightly move screen 20 in the opposite intended direction or deploy to remove and/or retract attachment mechanism 14 from hole 16. This allows screen 20 to travel along track 12 and deploy in the right direction. If the passenger wants to deploy screen 20 in the left direction, the passenger may manually move screen 20 in the opposite intended direction of deployment, i.e., in the right direction, to remove and/or retract attachment mechanism 14 from hole 16. The passenger may only have to minimally or slightly move screen 20 in the opposite intended direction or deploy to remove and/or retract attachment mechanism 14 from hole 16. This allows screen 20 to travel along track 12 and deploy in the left direction. In some embodiments, the cushion track system may be configured such that screen 20 may only be deployed in the right direction. In some embodiments, the cushion track system may be configured such that screen 20 may only be deployed in the left direction. In some embodiments, the cushion track system may be configured such that screen 20 may be deployed in the right direction and the left direction. In some embodiments, the cushion track system may be configured such that screen 20 may be deployed in an upwards direction from the cushion. In some embodiments, the cushion track system may be configured such that screen 20 may be deployed in a downwards direction from the cushion. In some embodiments, the cushion track system may be configured such that screen 20 may be deployed in an upwards direction from the cushion and in a downwards direction from the cushion.

As mentioned above, attachment mechanism 14 may be any other appropriate means, e.g., screws, fasteners, bolts, clips, and/or straps (e.g., Velcro® straps). In some embodiments, cushion 4 may include a release mechanism to deploy screen 20. The release mechanism may be a button, a lever, an actuator, or any other appropriate release mechanism to deploy screen 20 from cushion 4.

As shown in FIG. 5, cushion 4 may include a plurality of screens 20. For example, cushion 4 may include a first screen 22 and a second screen 24. The cushion track system may be configured to deploy first screen 22 in a first direction and second screen 24 in a second direction. For example, the passenger may deploy first screen 22 in a right direction and then deploy second screen 24 in a left direction. In another example, the passenger may deploy second screen 24 in a left direction and then deploy first screen 22 in a right direction. In other examples, first screen 22 and second screen 24 may be deployed simultaneously. Once first screen 22 and second screen 24 are deployed from cushion 4 via the cushion track system as described above, one or both of first screen 22 and second screen 24 may be adjustable, e.g., pivotable respective to the position of cushion 4. As such, the passenger may adjust one or both of first screen 22 and second screen 24. For example, first screen 22 and/or second screen 24 may be adjusted to conform to the passenger's body type and positioning within seat 200. For example, the passenger may adjust cushion 4 to a desired location on seatback 2, e.g., near the passenger's waist. The passenger may then deploy first screen 22 and/or second screen 24 to act as armrests. The passenger may then adjust the positioning, e.g., the angle, of first screen 22 and/or second screen 24, such that the angle of first screen 22 and/or second screen 24 may be comfortable for the passenger to rest on.

Referring to FIGS. 6A and 6B, cushion 4 may include a cushion track system for each of first screen 22 and second screen 24. The cushion track system may correspond to and/or include similar components to the cushion track system detailed in FIG. 4 and as described above. As shown in FIG. 6A, in a stowed position, first screen 22 may be located behind cushion 4 and second screen 24 may be located behind first screen 22. In other embodiments, first screen 22 and/or second screen 24 may be stowed within cushion 4 similarly to screen 20 as depicted in FIG. 3A.

As shown in FIG. 6A, a first cushion track system may include a track 30*a* and an attachment mechanism 32*a*. Attachment mechanism 32*a* may be ball and pin arrangements, screws, fasteners, bolts, clips, straps, or any appropriate attachment mechanism. Track 30*a* may be located at any appropriate portion of cushion 4. For example, track 30*a* may be located longitudinally on cushion 4. As shown in FIG. 6A, track 30*a* may include a hole 34*a*. Attachment mechanism 32*a* may be attached to a portion of first screen 22. In embodiments where attachment mechanism 32*a* is a ball and pin arrangement, attachment mechanism 32*a* may interact with hole 34*a* of track 30*a* to secure first screen 22 onto cushion 4. For example, attachment mechanism 32*a* may be received within hole 34*a* of track 30*a*.

Cushion 4 may include a second cushion track system for attaching second screen 24 to a portion of first screen 22. The second cushion track system may include a track 30*b* and an attachment mechanism 32*b*. Attachment mechanism 32*b* may be ball and pin arrangements, screws, fasteners, bolts, clips, straps, or any appropriate attachment mechanism. Track 30*b* may be located at any appropriate portion of first screen 22. For example, track 30*b* may be located longitudinally on first screen 22. As shown in FIG. 6A, track 30*b* may include a hole 34*b*. Attachment mechanism 32*b* may be attached to a portion of second screen 24. In embodiments where attachment mechanism 32*b* is a ball and pin arrangement, attachment mechanism 32*b* may interact with hole 34*b* of track 30*b* to secure second screen 24 onto first screen 22. For example, attachment mechanism 32*b* may be received within hole 34*b* of track 30*b*.

To deploy second screen 24, the passenger may manually move second screen 24 in the opposite intended direction of deployment, i.e., in the right direction, to remove and/or retract attachment mechanism 32*b* from hole 34*b*. This allows second screen 24 to travel along track 30*b* and deploy in the left direction. To deploy first screen 22, the passenger may manually move first screen 22 in the opposite intended direction of deployment, i.e., in the left direction, to remove and/or retract attachment mechanism 32*a* from hole 34*a*. This allows first screen 22 to travel along track 30*a* and deploy in the right direction. During use, the passenger may only deploy second screen 24 or the passenger may deploy both second screen 24 and first screen 22. FIG. 6B depicts an exemplary view of deployed first screen 22 and second screen 24. One of ordinary skill in the art may understand that cushion 4, the cushion track systems, first screen 22, and/or second screen 24, may be configured such that first screen 22 may be attached to a portion of second screen 24, and where second screen 24 may be attached to cushion 4, such that first screen 22 may be deployed first in a first direction and then second screen 24 may be deployed second in a second direction.

FIG. 7 depicts a seat 300 and an exemplary view of deployed first screen 22 and deployed second screen 24, prior to adjustment of first screen 22 and second screen 24. In FIG. 7, first screen 22 and second screen 24 may be located behind seatback 2. The passenger may adjust first screen 22 and/or second screen 24 relative to cushion 4 and corresponding attachment means 32*a*, 32*b*, and to a desired position or angle, e.g., a position to provide additional comfort to the passenger.

As shown in FIG. 8, first screen 42 and/or second screen 44 may each include a plurality of screens. For example, in seat 400, first screen set 42 may include plurality screens 42*a*-42*e* and second screen set 44 may include plurality of screens 44*a*-44*e*. First screen set 42 and/or second screen set 44 may include any appropriate number of screens. For example, first screen set 42 and/or second screen set 44 may each include at least one screen, at least two screens, at least three screens, at least four screens, or at least five screens. The number of screens for each screen set may be equivalent or they may differ. In other words, the number of screens in first screen set 42 may be equivalent to the number of screens in second screen set 44. Alternatively, the number of screens in first screen set 42 may differ from the number of screens in second screen set 44.

While FIGS. 9A and 9B depict second screen set 44, the discussion of second screen set 44 may be applicable to first screen set 42. In the stowed position, plurality screens 44*a*-44*e* may be folded up (FIG. 9A) and in the expanded position, plurality of screens 44*a*-44*e* may be fanned out in various positions and/or angles to allow for various levels of privacy and/or additional surface area for the passenger. For example, second screen set 44 may be configured similarly to a folding fan.

First screen 22 and/or second screen 24 may have various configurations. For example, as shown in FIGS. 10 and 11, first screen 52 and/or second screen 54 may each have an L-shaped structure. First screen 52 may include a folding portion 53 and/or second screen 54 may include a folding portion 55. The folding portion may be attached to or a part of its corresponding screen. If the folding portion is attached to a portion of its corresponding screen, the folding portion may be attached by a screw, a bolt, a pin system, or any other appropriate attachment mechanism that may still allow folding portion to rotate, i.e., fold towards its corresponding screen.

FIG. 11 depicts second screen 54 and folding portion 55. The discussion of second screen 54 and folding portion 55 may be applicable to first screen 52 and folding portion 53. Folding portion 55 may be foldable and/or pivotable relative to attachment point 70. During use, the passenger may first adjust the positioning of first screen 52 and/or second screen 54, and then further adjust the positioning of the corresponding folding portion.

As shown in FIG. 11, second screen 54 and/or folding portion 55 may include additional components. For example, second screen 54 and/or folding portion 55 may include a mirror 72, a universal serial bus (USB) (not shown), headphone inlets 76, a speaker 78, a speaker inlet 79, or combinations thereof.

In other embodiments, any of the screens discussed herein may include additional components. For example, the screens may include a mirror 72, a universal serial bus (USB), headphone inlets 76, a speaker 78, a speaker inlet 79, a screen for displaying videos (e.g., via cellphones, tablets, etc.), or combinations thereof.

The description above and examples are illustrative and are not intended to be restrictive. One of ordinary skill in the art may make numerous modifications and/or changes without departing from the general scope of the invention. For example, and as has been referenced, aspects of above-described embodiments may be used in any suitable combination with each other. Additionally, portions of the above-described embodiments may be removed without departing from the scope of the invention. In addition, modifications may be made to adapt a particular situation or aspect to the teachings of the various embodiments without departing from their scope. Many other embodiments will also be apparent to those of skill in the art upon reviewing the above description.

What is claimed is:

1. A seat comprising:
- a seatback;
- a cushion including a cushion track system having a track, wherein the track is fully contained within the cushion;
- a screen; and
- a track system including a rail and an attachment mechanism,
- wherein the cushion is secured to the seatback via the track system and the cushion is configured to move along the seatback in a vertical direction;
- wherein, in a first position, the screen is stowed within the cushion, and in a second position, the screen is deployed from the cushion along the track;
- wherein the screen is selectively deployable from a first side of the cushion in a first direction and from a second side of the cushion in a second direction, wherein the second side is opposite from the first side.

2. The seat of claim 1, wherein the cushion is attached to a frontal surface of the seatback.

3. The seat of claim 1, wherein the attachment mechanism is a ball and pin arrangement, a screw, a fastener, a bolt, a clip, or combinations thereof.

4. The seat of claim 1, wherein the track system includes a plurality of rails and a plurality of attachment mechanisms.

5. The seat of claim 1, wherein the rail is arranged along the seatback in a vertical direction.

6. The seat of claim 1, further comprising a release mechanism for moving the cushion via the cushion track system.

7. The seat of claim 1, wherein the screen is configured to serve as at least one of a privacy barrier, a hygiene guard, or an additional surface for supporting an appendage of a passenger.

8. The seat of claim 1, wherein the cushion is secured to the seatback by a press-fit or friction-based attachment.

9. The seat of claim 6, wherein the release mechanism includes a button, a lever, or an actuator.

10. The seat of claim 6, wherein the release mechanism is located on the seatback proximate to the cushion.

11. The seat of claim 6, wherein the release mechanism includes a plurality of release mechanisms located on different portions of the seat.

12. The seat of claim 1, wherein the screen includes a planar surface.

13. The seat of claim 1, wherein the screen includes a curved surface.

14. The seat of claim 1, wherein at least one of the cushion and/or the screen includes a foam material.

15. The seat of claim 1, wherein at least one of the cushion and/or the screen includes a composite material, a polymer, or a metal.

16. The seat of claim 1, wherein the cushion has a width ranging from 4 inches to 20 inches.

17. The seat of claim 1, wherein the first direction is a left direction and the second direction is a right direction.

18. The seat of claim 1, wherein the first direction is an upward direction and the second direction is a downward direction.

19. The seat of claim 1, wherein the cushion and the screen are composed of a similar or identical material.

* * * * *